United States Patent
Voyer et al.

(10) Patent No.: US 8,213,386 B2
(45) Date of Patent: Jul. 3, 2012

(54) METHOD AND DEVICE FOR CARRYING OUT A HANDOVER BETWEEN BASE STATIONS OF A MOBILE TELECOMMUNICATION NETWORK FOR A MOBILE TERMINAL

(75) Inventors: Nicolas Voyer, Rennes (FR); Herve Bonneville, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 567 days.

(21) Appl. No.: 12/415,194

(22) Filed: Mar. 31, 2009

(65) Prior Publication Data
US 2009/0245204 A1 Oct. 1, 2009

(30) Foreign Application Priority Data

Mar. 31, 2008 (EP) ..................................... 08006278

(51) Int. Cl.
*H04W 4/00* (2009.01)
*H04W 36/00* (2009.01)
*H04L 12/28* (2006.01)
*H04L 12/56* (2006.01)

(52) U.S. Cl. ......................... 370/331; 370/394; 455/438
(58) Field of Classification Search .................. None
See application file for complete search history.

(56) References Cited

U.S. PATENT DOCUMENTS

| | | | |
|---|---|---|---|
| 7,590,064 B1* | 9/2009 | Zhang et al. | 370/235 |
| 2002/0094813 A1* | 7/2002 | Koshimizu et al. | 455/436 |
| 2003/0224786 A1* | 12/2003 | Lee et al. | 455/432.1 |
| 2005/0185619 A1* | 8/2005 | Niemela et al. | 370/331 |
| 2008/0242303 A1* | 10/2008 | Takahashi et al. | 455/436 |
| 2008/0310368 A1* | 12/2008 | Fischer | 370/331 |
| 2009/0003283 A1* | 1/2009 | Meylan | 370/331 |

FOREIGN PATENT DOCUMENTS

| | | |
|---|---|---|
| EP | 1 059 823 A1 | 12/2000 |
| WO | WO 2006/130354 A1 | 12/2006 |
| WO | WO 2007/130325 A2 | 11/2007 |

* cited by examiner

*Primary Examiner* — Andrew Chriss
(74) *Attorney, Agent, or Firm* — Oblon, Spivak, McClelland, Maier & Neustadt, L.L.P.

(57) ABSTRACT

A method and system for carrying out a handover between base stations of a telecommunication network. Each mobile terminal is in communication with a set of base stations including at least a first and a second base stations, the first base station receiving downlink data to be transmitted within data packets bearing a downlink sequence number to a first mobile terminal from an access gateway of the telecommunication network. The method includes determining a downlink sequence number, sending a handover request message to the second base station comprising the determined downlink sequence number and information related to the set of base station, requesting the second base station to receive data to be transmitted to the first mobile terminal from the access gateway, and stopping building data packets if the built data packets would bear a sequence number equal or higher than the determined downlink sequence number.

17 Claims, 7 Drawing Sheets

METHOD AND DEVICE FOR CARRYING OUT A HANDOVER BETWEEN BASE STATIONS OF A MOBILE TELECOMMUNICATION NETWORK FOR A MOBILE TERMINAL

CROSS-REFERENCE TO RELATED APPLICATIONS

This application claims priority from European Patent Application No. 08006278.9, filed Mar. 31, 2008, the entire contents of which are hereby incorporated by reference herein.

BACKGROUND OF THE INVENTION

The present invention is related to a method for carrying out a handover between base stations of a mobile telecommunication network for a mobile terminal. The present invention also relates to a base station of a mobile telecommunication network provided for carrying out that method of handover. It also relates to computer programs in order for that method to be implemented.

Generally, in a telecommunication network, a mobile terminal is in communication with only one base station. However, it may happen that a second base station becomes more effective than the first base station for different reasons. In such a case, a handover process is realized consisting in switching the first base station that serves the mobile terminal, said the source base station, to the second base station, called the target base station.

For example, in traditional cellular systems (e.g. LTE), handover requires to setup a new radio channel between the mobile terminal and the target base station, and to release the old radio channel between the mobile terminal and the source base station.

Also, for example, in 3G cellular telecommunication networks, featuring soft handover, the RRC signaling is always established in the RNC and handovers can be viewed as a succession of Active Set Update (ASU) procedures, where the mobile terminal sees the number of its radio links vary over time, by successive extensions and reductions.

The present invention proposes a handover procedure in a telecommunication network wherein a mobile terminal is generally in communication with more than two base stations, one base station acting as a main base station and thus linked to the access gateway of the telecommunication network whereas the other base stations act as supplementary base stations and thus linked to the main base station. In such telecommunication network, a handover procedure is not so simple that the handover procedure of the above mentioned state of the art.

Figure 1:
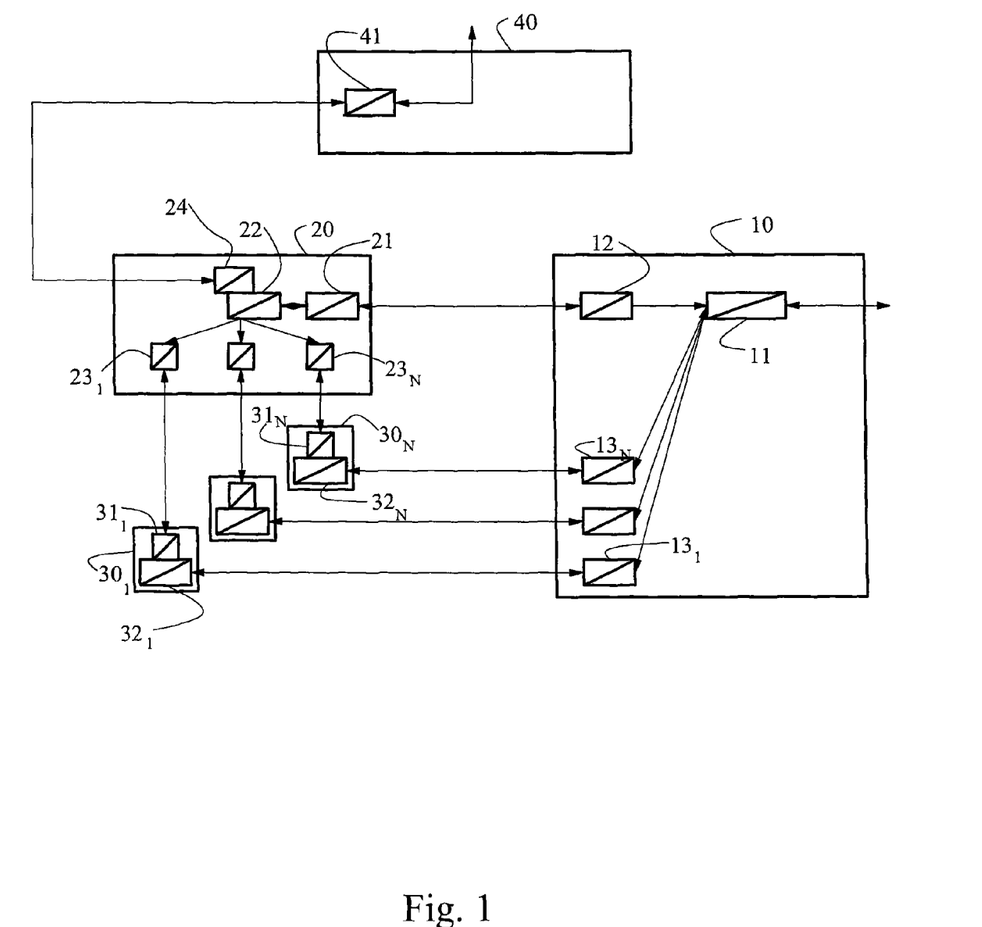
FIG. 1 shows the elements involved in a telecommunication network according to the invention when a mobile terminal is in communication with a plurality of base stations and an access gateway.

An example of such telecommunication network is now described in relation with FIG. 1.

FIG. 1 shows the elements of mobile telecommunication network involved in a telecommunication with a same mobile terminal 10. These elements are a base station 20, which here acts as a main base station in the network as it will be seen later on, a number N of base stations $30_1$ to $30_N$ (here, N=3), which act as supplementary base stations as it will be seen later on, and a gateway 40. N may either be predetermined or depend on transmission conditions over the channel between the mobile terminal 10 and the main base station 20 or a supplementary base station $30i$.

As to the mobile terminal 10, it includes a splitter/combiner 11, a main radio frequency transceiver 12 and N supplementary radio frequency transceivers $13_1$ to $13_N$.

The main base station 20 includes a radio frequency transceiver 21 provided for communicating with the main RF transceiver 12 of the mobile terminal 10, a splitter/combiner 22, N inter base stations tunnel interfaces $23_1$ to $23_N$ and a gateway tunnel interface 24.

Each supplementary base station $30_i$ includes an inter base stations tunnel interface $31_i$ linked to a RF transceiver $32_i$. Each tunnel interface $31_i$ is provided for being linked to a tunnel interface $23_i$ in the main base station 20 in order to form a tunnel. The tunnel may be of the X2 type. As for each RF transceiver $32_i$, it is provided for communicating with a supplementary RF transceiver $13_i$ in the mobile terminal 10.

The gateway 40 includes a tunnel interface 41 provided for being linked to the tunnel interface 24 of the main base station 20 and for receiving/transmitting the data flow to another terminal (not shown). The tunnel, created between the main base station 20 and the gateway 40 thanks to the tunnel interfaces 24 and 41, may be of the S1 type.

In the downlink, the other terminal (not shown) acts as a data source and feeds the gateway 40 and, particularly, the interface 41 of the gateway 40. The data flow is transmitted to the interface 24 of the main base station 20 and then to the splitter/combiner 22 where it is split into a main data sub-flow intended to be transmitted by the RF transceiver 21 to the mobile terminal 10 and N supplementary data sub-flows intended to be transmitted via the tunnel interfaces $23_1$ to $23_N$ of the main base station 20 and the tunnel interfaces $31_1$ to $31_N$ of the supplementary base stations $30_1$ to $30_N$ to the supplementary base stations $30_1$ to $30_N$. Each supplementary data sub-flow is then transmitted to the mobile terminal 10 via the RF transceiver $32_i$ of a supplementary base station $30_i$ and is received by the RF transceivers $13_i$ of the mobile terminal 10.

Note that each data sub-flow is constituted of data packets, each having a sequence number SN_DL assigned by the splitter 22. Whether the splitter 22 forks a data packet in the main data sub-flow or in the supplementary data sub-flow may for example depend on quality estimates reports sent by the mobile terminal 10 to the main base station 20 either directly or via the supplementary base stations 30 and/or may depend on quality estimates reports sent by the supplementary base station 30.

The combiner 11 of the mobile terminal 10 combines all the data sub-flows received by the main transceiver 12 and the supplementary transceivers $13_1$ to $13_N$ and delivers the recombined data flow to the output of the mobile terminal 10.

In the uplink, the mobile terminal 10 acts as a data source and feeds the splitter/combiner 11 of the mobile terminal 10. Here, the splitter 11 splits the data flow into a main data sub-flow intended to be transmitted to the RF transceiver 12 where it is sent to the main base station 20 and into N supplementary data sub-flows intended to be transmitted to the RF transceivers $13_1$ to $13_N$ where they are sent to the respective supplementary base stations $30_1$ to $30_N$. In each supplementary base station $30_i$, the received supplementary data sub-flow is transmitted to the main base station 20 via the tunnel formed between the tunnel interface $31_i$ of the supplementary base station $30_i$ and the tunnel interface $23_i$ of the main base station 20.

The main data sub-flow received by the RF transceiver 21 and the supplementary data sub-flows received by the respective tunnel interface $23_i$ are combined in the splitter/combiner 22 of the main base station 20 and the resulting data flow is delivered to the gateway 40 by means of the tunnel interface 24 of the main base station 20 and the tunnel interface 41 of the gateway 40 and then to the other terminal (not shown).

Note that the splitter 10 marks each data packet sent by the mobile terminal 10 with a SN UL sequence number that is incremented each time a data packet of the data flow arrives in the splitter 10. Consecutive out-of-sequence data packets received by the combiner 22 are then recombined by the main base station 20 to build back the initial data flow fed initially to the splitter 10, composed of in-sequence consecutive data packets.

For example, at the output of a splitter/combiner, each split data sub-flow is different on each of the sub-flows so that each data sub-flow corresponds to a portion of the flow of data that differs from other portions of the flow of data to which correspond the other data sub-flows. In order for a splitter/combiner to determine which portion of the data it will send to a transceiver, it may receive from all the transceivers transmission indicator information, i.e. information about the status of the FIFO of the RF transceivers (full, expanding, steady, shrinking, empty), about the estimated radio link quality of the physical interface between two RF transceivers, about the achievable data rate or about the load indication over this physical interface, etc.

Note that base stations 20 and $30_1$ to $30_N$ are all identical base stations of the mobile telecommunication network. When considering all the base stations in communication with a same mobile terminal 10, only one of them acts as a main base station 20 then carrying out the above described means 21 to 24 whereas the other base stations act as supplementary base stations $30_i$ then carrying out the above described means $31_i$ and $32_i$. Which base station acts as a main base station whereas the others act as supplementary base stations depends on different parameters and conditions, for example radio frequency telecommunication conditions, which are not of importance for the present description.

Note also that only the base station 20 that acts as a main base station is linked to the gateway 40 whereas the other base stations are linked to the base station acting as a main base station.

Note also that the mobile telecommunication network contains more than one mobile terminal, and that one base station 20 acting as a main base station for a given mobile terminal can simultaneously act as a supplementary base station for another mobile terminal.

In such telecommunication network, it may happen that the transmission conditions over at least one of the radio links change. For example, it may result in a change of the status of the FIFO of a transceiver, or of the estimated radio link quality, of the data rate, etc. Following that transmission conditions change, the set of base stations involved during the transmission with a same mobile terminal has to be changed, for example, by adding new supplementary base stations or by removing existing supplementary base stations. The change of the set of base stations may also result in that the base station that has acted up to now as a main base station has now to act as a supplementary base station, then carrying out the above described means 31 and 32 while one of the base stations involved during the transmission with a same mobile terminal and acting up to now as a supplementary base station has now to act as a main base station, then carrying out the above described means 21 to 24. In this case, in the following, the old main base station will be said the "source base station" while the supplementary base station that will become the main base station will be said the "target base station". All the modifications of the set of base stations are achieved during a procedure which is called a handover procedure.

SUMMARY OF THE INVENTION

The aim of the present invention is to propose a method for carrying out a handover between base stations of a mobile telecommunication network as described above in relation with FIG. 1 for a same mobile terminal.

To this end, the present invention concerns method for carrying out a handover between base stations of a telecommunication network, wherein each mobile terminal is in communication with a set of base stations including at least a first and a second base stations, the first base station receiving downlink data to be transmitted within data packets bearing a downlink sequence number to a first mobile terminal from an access gateway of the telecommunication network. It is characterized in that it includes the steps executed by the first base station of determining a downlink sequence number, sending a handover request message to the second base station comprising the determined downlink sequence numbers, and information related to the set of base station, requesting the second base station to receive data to be transmitted to the first mobile terminal from the access gateway, stopping building data packets to be transmitted to the first mobile terminal from data received from the access gateway if said built data packets would bear a sequence number equal or higher than the determined downlink sequence number, then sending said data received from the access gateway to the second base station, receiving data packets to be transmitted to the first mobile terminal from the second base station, transmitting directly to the first mobile terminal the data packets to be transmitted to the first mobile terminal received from the second base station, receiving specific data from the access gateway indicating that subsequent data will be now transmitted to the second base station, and then releasing the dedicated link between said first base station and said access gateway.

According to another aspect of the invention, wherein each mobile terminal sends to the base stations of the set of base stations data packets bearing a uplink sequence number, the first base station managing the signaling messages of the first mobile terminal and other base stations of the set of base stations relaying data packets received from the first terminal to the first base station, said method comprises the following steps executed by the first base station:

determining a uplink sequence number and sending it to the second base station, receiving data packets directly from the first mobile terminal or from other base station, building data from the received data packet and forwarding said built data to the access gateway if said received data packet is bearing a sequence number smaller than the determined uplink sequence number, and forwarding the received data packet to the second base station if said received data packet is bearing a sequence number higher than the determined uplink sequence number.

According to another aspect of the invention, said method comprises the steps executed by the first base station of receiving a handover request acknowledgement message comprising information related to a final set of base stations including the base stations involved in the communication with said first mobile terminal after said handover completion, and releasing the dedicated links established with base stations of the current set of base stations, which do not belong to the final set of base stations.

According to another aspect of the invention, said method comprises steps executed by the first base station of
sending directly to the first mobile terminal a handover command message, requesting said first mobile terminal to now send signaling messages to the second base station, and
stopping to manage signaling messages received from the first mobile terminal.

According to another aspect of the invention, the sent handover command message comprises information related to the base stations of said final set of base stations.

According to another aspect of the invention, said method comprises further steps executed by the first base station of:
receiving a handover request message from a third base station that receives data to be transmitted within data packets bearing a downlink sequence number to a second mobile terminal from an access gateway of the telecommunication network, said handover request message requesting the first base station to receive data to be transmitted to said second mobile terminal from said access gateway and comprising downlink and uplink sequence numbers, and information related to the set of base stations with which the second mobile terminal is currently in communication,
determining a final set of base stations including the base stations involved in the communication with said second mobile terminal after said handover completion, and
sending a handover notification message to each base station of said final set of base stations comprising the downlink and uplink sequence numbers and informing each base station of said set of base stations that the first base station now receives data to be transmitted to the second mobile terminal from the access gateway, and
establishing a dedicated link between the first base station and each base station of said final set of base stations.

According to another aspect of the invention, said final set of base stations contains base stations which have a network interface established with the first base station, and said method then comprises further step executed by the first base station of sending a handover request answer message to the third base station comprising information related to the base stations of said final set of base stations.

According to another aspect of the invention, said method comprises further steps executed by the first base station of
receiving data from the access gateway via the third base station,
starting building data packets to be transmitted to the second mobile terminal from said received data, the first built data packet bearing a downlink sequence number equal to the downlink sequence number that is contained in the received handover request message, and
sending built data packets to be transmitted to the second mobile terminal directly or via one dedicated link established with one base station of said set of base stations.

According to another aspect of the invention, said method comprises further steps executed by the first base station of
establishing a dedicated link with the access gateway,
receiving data from the access gateway over the established dedicated link,
receiving data from the third base station with a last packet marking indication,
building and sending data packets from the data received from the third base station,
starting building data packets from data received from the access gateway, and
sending built data packets to be transmitted to the second mobile terminal directly or via one established dedicated link with one base station of the set of base stations which information is comprised in the received handover request message.

According to another aspect of the invention, said method comprises further steps executed by the first base station of
receiving directly from the second mobile terminal data packets bearing a uplink sequence number higher than the uplink sequence number that is contained in the received handover request message,
receiving data packets via any dedicated link established with base stations of the set of base station of which information is comprised in the received handover request message,
building data from the thus received data packets,
forwarding said built data to the access gateway via the dedicated link established with the access gateway.

According to another aspect of the invention, said method comprises further steps executed by the first base station of managing signaling messages received from the second mobile terminal.

According to another aspect of the invention, said method comprises further steps executed by the first base station of sending directly signaling messages to the second mobile terminal.

According to another aspect of the invention, said method comprises further steps executed by the first base station of:
receiving a handover notification message from a fourth base station comprising downlink and uplink sequence numbers and informing the first base station that said fourth base station will receive data to be transmitted to a third mobile terminal from an access gateway,
establishing a dedicated link between the first base station and said fourth base station,
receiving data packets to be transmitted to the third mobile terminal from the fourth base station over the dedicated link established between the first base station and the fourth base station, and
transmitting directly to the third mobile terminal the received data packet to be transmitted to the third mobile terminal.

According to another aspect of the invention, said method comprises further steps executed by the first base station of
receiving directly from the mobile terminal data packets bearing a uplink sequence number higher than the uplink sequence number that is contained in the received handover notification message, and
sending to the fourth base station over the established dedicated link the received data packets bearing a uplink sequence number higher than the uplink sequence number that is contained in the received handover notification message.

According to another aspect of the invention, said method comprises further steps executed by the first mobile terminal of
receiving from the first base station a handover command message requesting said first mobile terminal to send signaling messages to the second base station,
stopping sending signaling messages to the first base station, and
starting sending signaling messages to the second base station.

According to another aspect of the invention, said method comprises further steps executed by the first mobile terminal of
stopping receiving data packets from the base stations of the set of base stations which are not comprised in the final set of base stations, of which information is comprised in the received handover command message, stopping sending data packets to the base stations of the set of base stations which are not comprised in the final set of base stations, of which information is comprised in the received handover command message, identifying the final set of base stations of which information is comprised in the received handover command message, as the set of base stations with which said first mobile terminal is in communication.

The present invention also concerns a device for carrying out a handover between base stations of a telecommunication network, wherein each mobile terminal is in communication with a set of base stations including at least a first and a second base stations, the first base station receiving data to be transmitted within data packets bearing a sequence number to a first mobile terminal from an access gateway of the telecommunication network. Said device is characterized in that the device is included in the first base station and comprises:

means for determining a downlink sequence number, means for sending a handover request message to the second base station comprising the determined downlink sequence number, and information related to the set of base station, requesting the second base station to receive data to be transmitted to the first mobile terminal from the access gateway, means for stopping building data packets to be transmitted to the first mobile terminal from data received from the access gateway if said built data packets would bear a sequence number equal or higher than the determined downlink sequence number, means for sending said data received from the access gateway to the second base station, means for receiving data packets to be transmitted to the first mobile terminal from the second base station, means for transmitting directly to the first mobile terminal the data packets to be transmitted to the first mobile terminal received from the second base station, means for receiving specific data from the access gateway indicating that subsequent data will be now transmitted to the second base station, and means for releasing the dedicated link between said first base station and said access gateway.

The present invention also concerns another device for carrying out a handover between base stations of a telecommunication network, wherein each mobile terminal is in communication with a set of base stations including at least a first and a second base stations, the first base station receiving data to be transmitted to a first mobile terminal from an access gateway of the telecommunication network. Said device is characterized in that the device is included in the mobile terminal and comprises:

means for receiving from the first base station a handover command message, requesting said first mobile terminal to send signaling messages to the second base station, means for stopping sending signaling messages to the first base station, and means for starting sending signaling messages to the second base station.

The present invention further concerns computer programs which can be directly loadable into a programmable device, comprising instructions or portions of code for implementing the steps of the method as previously characterized, when said computer program is executed on a programmable device.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION OF THE INVENTION

According to the invention, an entire handover procedure starts with all the base stations of the mobile telecommunication network in a communication with a mobile terminal in an initial situation, (said base stations forming an initial set of base stations) and finishes with some of the initial base stations and other base stations of the network in a final situation (said base stations now forming what is called a final set of base stations).

In the preamble of the description and in the claims, we consider a first base station, which successively acts as a source base station whereas the target base station is said the second base station, the mobile terminal being then said the first mobile terminal, as a target base whereas the third base station acts a source base station, the mobile terminal being then said the second mobile terminal, as a supplementary base station, a target base station excepted which is said in this case the fourth base station, the mobile terminal being then said the third mobile terminal.

However, in the description below, for clarity purposes, we consider a source base station, generally referred to as a source base station 50, a target base station, generally referred to as a target base station 60 and a supplementary base station, generally referred to as a supplementary base station 70 as well as an unique mobile terminal generally referred to as a mobile terminal 10. But it must be understood that, depending on the considered moment during a communication with a given mobile terminal or on the considered communication with a mobile terminal, a same base station can act either as a source base station, or a target base station, or a supplementary base station.

Figure 2:
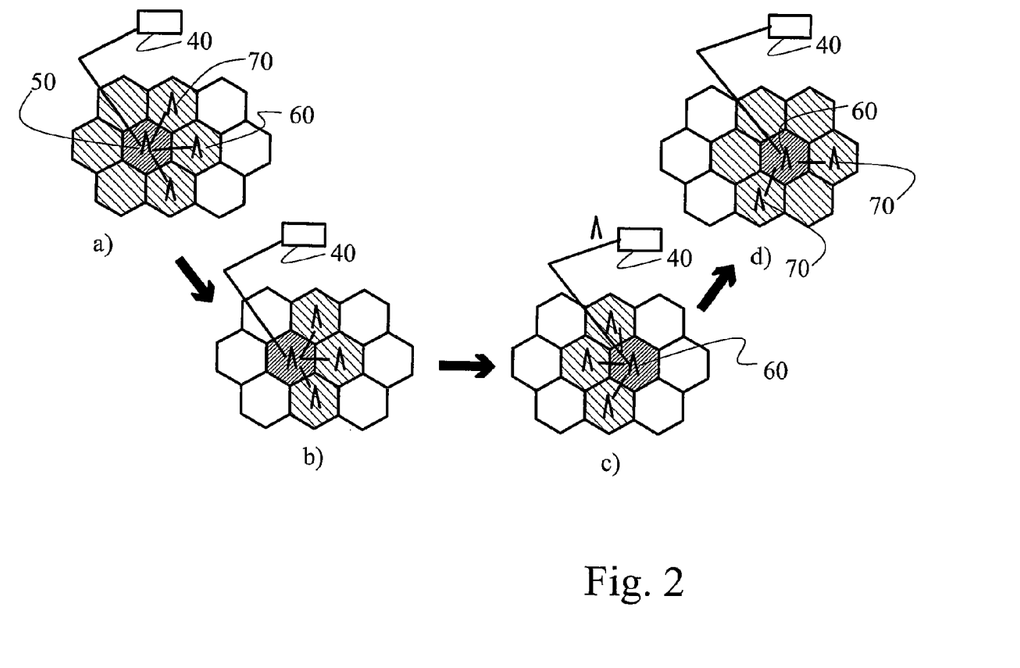
FIG. 2 illustrates the principle of a handover method according to the present invention.

As shown in situation a) depicted in FIG. 2, in an initial situation wherein a same mobile terminal 10 is in communication with a set of base stations (the area covered by these base stations are represented as to hatched hexagons, the hatches being tighter for the area covered by the main base station 50), the source base station 50 which is linked to the gateway 40, for example by means of a dedicated link such as an S1 tunnel, is also linked to a number N of supplementary base stations 70, for example by means of X2 tunnels. The source base station 50 acts as a main serving base station, and has a primary radio channel established with the mobile terminal 10. Each supplementary base station 70 has a supplementary radio channel established with the mobile terminal 10.

In a variant, data packets of delay sensitive data flows, such as video streaming, voice, or radio signaling flows are exchanged between the mobile terminal 10 and the access gateway 40 via only the primary radio channel, while data packets of other flows are exchanged between the mobile terminal 10 and the access gateway 40 also via the supplementary radio channels.

After completion of the handover procedure as shown in situation d) depicted in FIG. 2, a new base station 60 which is now the one that is linked to the gateway 40 by means of a new dedicated link, e.g. a S1 tunnel is also now linked with a number N' of supplementary base stations 70 by means of new dedicated links, e.g. X2 tunnels. Note that N' is generally different from the number N unlike the drawing in FIG. 2. The primary radio channel is the radio channel established between the mobile terminal 10 and the target base station 60, while the radio channel between the mobile terminal 10 and the source base station 50 has become a supplementary radio channel.

Figure 3:
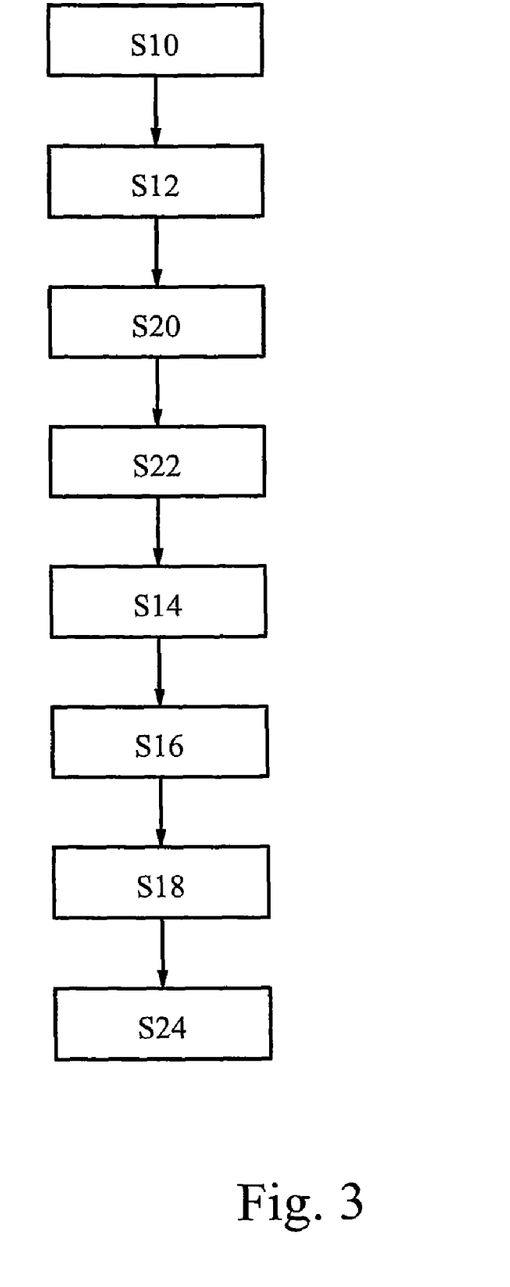
FIG. 3 is a diagram showing the steps that are carried out in a handover method according to the present invention.

The handover method according to the invention is now described in a more detailed manner in relation with FIG. 3 and with views on FIGS. 2a to 2d. As it will be understood later, in FIG. 3, references S10, S12, S14, S16 and S18 are carried out by the source base station 50 whereas references S20, S22 and S24 are carried out by the target base station 60.

According to the method of the invention, when a measurements report sent by the mobile terminal 10 is received by the source base station 50, said source base station 50 determines in a step S10 (see FIG. 3) which base station 60 in the current set of base stations 70 involved in the communication with the terminal mobile 10, if it exists, could advantageously act as a main base station and could then replace the source base station 50. That step is carried out by considering the quality and/or the efficiency of the communication with that mobile terminal 10, and/or by considering the disbalance of load between the source base station 50 and the base station 60 in terms of e.g. processing resource devoted to the handling of dedicated links with the access gateway 40 or with supplementary base stations 70.

The source base station 50 then sends in a step S12 a handover request message HRQ to the thus determined target base station 60, together with information describing the current set of base stations with which the mobile terminal 10 has established radio channels for the current communication and corresponding to the initial situation depicted above in relation with situation a) depicted in FIG. 2. Some information that was reported by the mobile terminal 10 in its measurements report may also be sent to the target base station 60.

Upon reception of the handover request HRQ from the source base station 50, the target base station 60 determines in a step S20 a new set of base stations with which the mobile terminal 10 will establish radio channels for the communication and with which the target base station 60 will have dedicated links, e.g. a X2 tunnels, after the completion of the handover procedure. This set of base stations actually corresponds to the final situation depicted above in situation d) depicted in FIG. 2 and is then called the final set of base stations. Then, the target base station 60 reports in step S22 this final set of base stations to the source base station 50.

Considering the current set of base stations 70 and the final set as determined by and received from the target base station 60, the source base station 50 determines in a step S14 an intermediate set of base stations 70, containing only the base stations 70 that are included in both the current set and the final set. Then, the source base station 50 operates in a step S16 a set reduction procedure with the mobile terminal 10 so as to reduce the current set to the intermediate set of base stations 70. This intermediate set of base stations is shown in situation b) depicted in FIG. 2.

The set reduction procedure S16 consists in releasing the dedicated links, for example X2 tunnels, established between the current source base station 50 and the supplementary base stations 70 that belong to the current set of base stations but not to the intermediate set of base stations 70. The mobile terminal 10 is kept informed of the contents of the set of base stations.

Then, the source base station 50 operates in a step S18 a handover procedure with the target base station 60. During this procedure, the target base station 60 becomes the main base station for the communication with the mobile terminal 10 and is therefore now the sole base station that is linked to the access gateway 40 whereas the source base station 50 which was up to now the main base station becomes a supplementary base station. After that step S18, the situation is the one depicted in situation c) depicted in FIG. 2. Note that the main base station is also the sole base station that manages the signaling signals either from the mobile terminal 70, from the access gateway 40 or from another base station.

The access gateway 40 has no longer any dedicated link with the source base station 50, but now has a dedicated link with the target base station 60. The source base station 50 has no longer any dedicated link with supplementary base stations 70, which now have a dedicated link with the target base station 60. The dedicated link between source base station 50 and target base station 60 has been replaced by a new dedicated link.

Finally, the target base station 60 operates in a step S24 a set extension procedure with the mobile terminal 10 so as to extend the current set to the final set of base stations. The set extension procedure consists in setting up for the mobile terminal 10 dedicated links, for example X2 tunnels, between the target base station 50 and the supplementary base stations 70 that belong to the final set of base stations 70 but not to the intermediate set of base stations 70. At that step S24, radio channels are established between radio transceivers 32 of these supplementary base stations 70 and radio transceivers 13 of the mobile terminal 10. The mobile terminal 10 is kept informed of the contents of the set of base stations.

An embodiment of the step of handover S18 of the source base station 50 with the target base station 60 is now described in relation with FIGS. 4a to 4f.

Figure 4A:
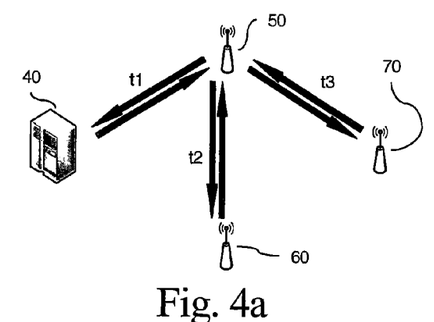
FIGS. 4a to 4f show the base stations and the access gateway involved in a telecommunication network and how they are linked to each other when a handover procedure is running.

Let's now consider the case where three base stations 50, 60 and 70 are involved in a communication with a same mobile terminal 10 via a gateway 40. As shown in FIG. 4a, in an initial situation, the gateway 40 is linked by means of a dedicated link t1, for example a S1 tunnel, with a base station 50, which is said the source base station, and the source base station 50 is linked to two supplementary base stations 60 and 70 by means of respective dedicated links t2 and t3, for example X2 tunnels, one base station being the target base station, i.e. the base station 60 that will become the main base station after the handover procedure completion.

In a first step (FIG. 4b), a new dedicated link t4 is established, for example a X2 tunnel, between the source base station 50 and the target base station 60 and a new dedicated link t5, for example a X2 tunnel is established between the target base station 60 and each of the supplementary base stations 70.

In a second step (FIG. 4c), instead of splitting the downlink data received from the access gateway 40 and distribute each split of downlink data packets to each supplementary base station 70 and 60, the source base station 50 simply relay the received downlink data to the target base station 60 via the established dedicated link t4. The target base station 60 splits the received downlink data received from the source base station 50 and sends each split of downlink data packets to each supplementary base station 70 and 50.

In a third step (FIG. 4*d*), after having set up a new dedicated link t6, for example a S1 tunnel, between the access gateway 40 and the target base station 60, the access gateway 40 starts sending downlink data to the target base station 60 rather than to the source base station 50, and the target base station 60 starts splitting downlink data received from the access gateway 40 and sends each split of downlink data packets to each supplementary base station 70 and 50.

In a fourth step (FIG. 4*e*), once the mobile terminal 10 starts transmitting data packets which are marked by a sequence number higher than a predetermined sequence number SN_UL_Last (this operation is described with greater detail below), the said uplink data packets are sent by each supplementary base station 70 and 50 to the target base station 60, which starts recombining the uplink data, and sends the uplink data to the access gateway 40 via the established dedicated link t6 between the access gateway 40 and the target base station 60.

Finally, in a fifth step (FIG. 4*f*), old dedicated links established between the source base station 50 and the supplementary base stations 70 and 60 are released, and the dedicated link t1 established between the source base station 50 and the access gateway 40 is released.

Figure 5:
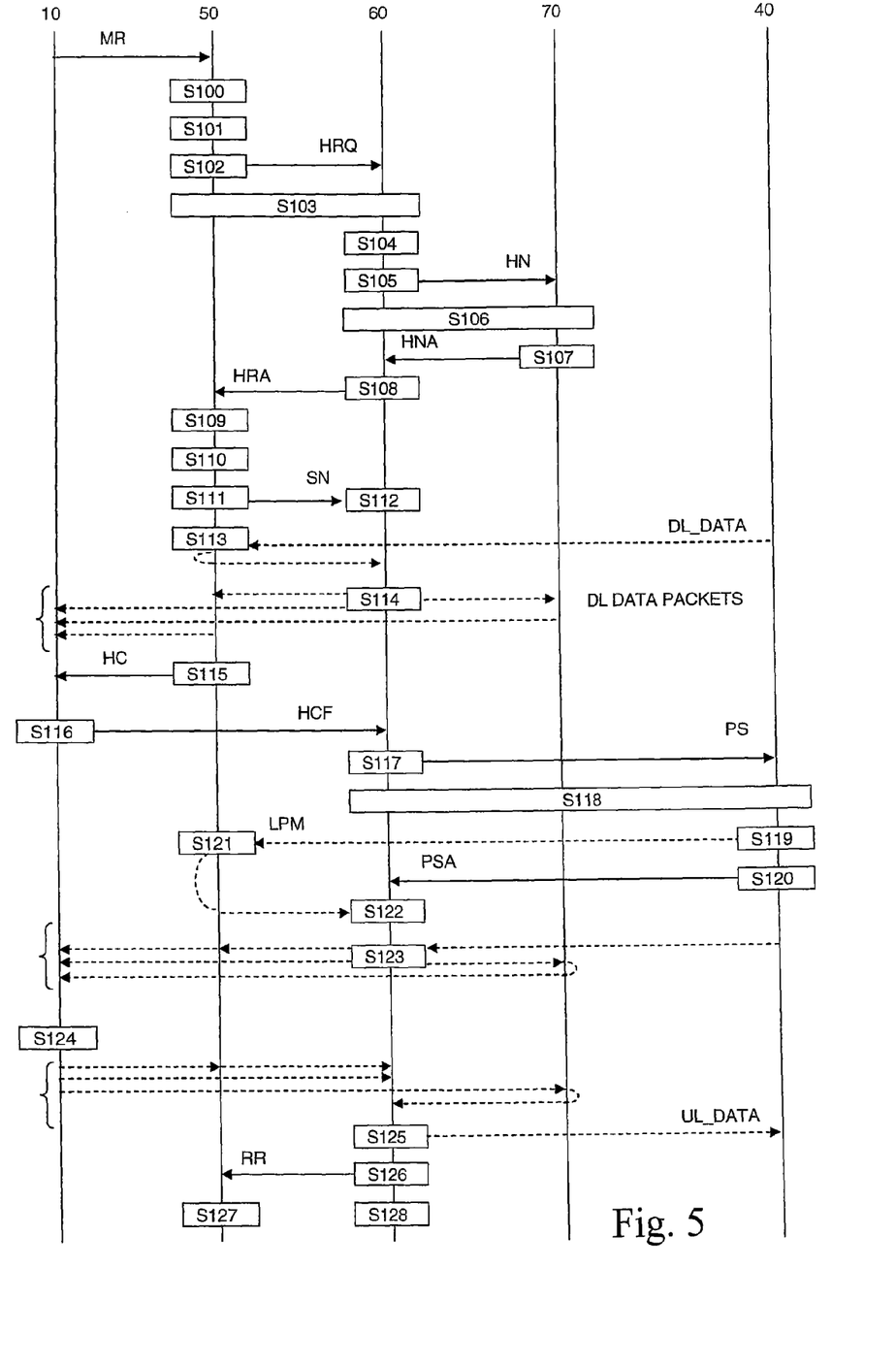
FIG. 5 illustrates the exchange of signals between the base stations and the access gateway involved in a telecommunication network as well as a mobile terminal, along with the steps carried out in such elements during a handover procedure according to the invention.

FIG. 5 depicts the exchange of signals between a source base station 50, a target base station 60, one out of all the supplementary base stations 70 and the mobile terminal 10 involved in the communication with those base stations as well as the operations made by all those devices.

The mobile terminal 10 transmits at regular times a measurement report message MR to its serving main base station that is here the base station 50.

At next step S100, upon reception of a message MR and using that message, the source base station 50 determines which base station 70 in the current set of base stations 70 involved in the communication with the terminal mobile 10, if it exists, could advantageously act as a main base station and could then replace the main base station 50. That step S100 is carried out by considering the quality and/or the efficiency of the communication with that mobile terminal 10, and/or by considering the disbalance of load between the source base station 50 and the base station 70 in terms of e.g. processing resource devoted to the handling of dedicated links with the access gateway 40 or with supplementary base stations 70.

When such a base station exists (that base station is now said the target base station 60 and the base station 50 is now said the source base station), a procedure has to be realized in order for the target base station 60 to be the main base station for the mobile terminal 10 after the completion of this procedure. This procedure is called a handover procedure.

As example, the decision to handover can be taken upon detection of a change in transmission conditions reflecting that the target base station 60 is getting a higher radio level or conversely, and/or that the source base station 50 is getting poor radio level, and/or that the radio level of the target base station 60 is crossing the radio level of the source base station 50 with respect to a given hysteresis, etc.

The radio level of a given base station is reported by the mobile terminal 10 in the MR message, and might be described as a received power level or a signal-to-interference plus noise level of signals being transmitted by the given base station.

The decision to handover can also be taken if the radio level of a new base station is becoming strong although the new base station is not a neighbor to the main base station making the handover to the new base station not possible. However, a handover to an intermediate base station which has established a radio channel with the mobile terminal and which has the highest level amongst the levels of the base stations that are both neighboring to the main base station and the new base station can be triggered. Afterwards, another handover could be realized from the intermediate base station with the new base station.

As other example, the decision to handover can also be taken if the target base station has a lower processing load than the source base station, or if the S1 interface carrying the S1 tunnel between the source base station 50 and the access gateway 60, is overloaded. The handover is then realized for load balancing purposes.

At next step S101, once the handover decision has been taken, the source base station 50 determines a sequence number SN_UL_Last corresponding to the sequence number of the last UL data packet received by the source base station 50 either directly from the mobile terminal 10 or via a supplementary base station 70 that will be recombined by the combiner 22 of the source base station 50 in order to send it to the access gateway 40. The UL data packets thus received but with a sequence number higher than SN_UL_Last will be recombined by the combiner 22 of the target base station 60.

At next step S102, the source base station 50 sends to the target base station 60 a handover request message HRQ, which contains information related to the supplementary base stations 70 and to the radio channel between those base stations 70 and the mobile terminal 10. For example, the message HRQ contains, for each supplementary base station 70, the identifiers CID and SRNTI, and/or other information such as duplex mode, frequency band being used, or any information identifying the radio channels established between the source base station 50, the supplementary base stations 70 and the mobile terminal 10. The message HRQ also contains the sequence number SN_UL_Last determined at step S101.

Figure 4B:
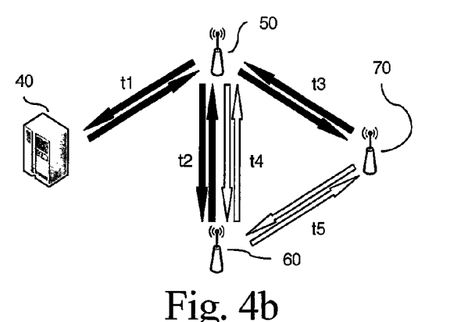

Upon reception of the message HRQ, the target base station 60 setups in a step S103, a dedicated link t4 with the source base station 50 (that link is a user plane interface such as the X2 tunnel t4 of FIG. 4*b*), and initializes a splitter/combiner 22 connected to the newly established link t4 for the mobile terminal 10.

Then at next step S104, the target base station 60 determines which supplementary base stations 70 will belong to the set of supplementary base stations of the target base station 60 after achievement of the handover procedure when the target base station 60 will have become a main base station. The target base station 60 can for example determine with which supplementary base stations 70 it has an established network relation, such as an X2 control plane interface. The set of such base stations 70 corresponds to the final set depicted in situation d) depicted in FIG. 2 and is now said the final set of base stations.

At next step S105, the target base station 60 sends to each of the supplementary base station 70 a handover notification message HN containing information related to the corresponding radio channel, e.g. the CID and SRNTI identifiers, and/or the sequence number SN_UL_Last contained in the received HRQ message, via a network relation, such as an X2 control plane interface, established between the target base station 60 and the supplementary base station 70.

At next step S106, upon reception of the HN message by a supplementary base station 70, a new dedicated link t5 is established between supplementary base station 70 and target base station 60 (that link is represented by the tunnel t5 in FIG. 4b).

Although a dedicated link t5 is thus established between the supplementary base station 70 and the target base station 60, UL data packets received by each supplementary base station 70, bearing a sequence number equal or lower than the sequence number SN_UL_Last contained in the received HN message are still sent to the source base station 50 either via the dedicated link t2 established between the source base station 50 and the target base station 60 or via the dedicated link t3 established between the source base station 50 and the supplementary base station 70 prior to the handover decision taken at step S1100.

However, from now, UL data packets received by each supplementary base station 70 and bearing a sequence number higher than or equal to the sequence number SN_UL_Last contained in the received HN message will no longer be sent to the source base station 50 but to the target base station 60 via the new dedicated link t5 established between the target base station 60 and the supplementary base station 70 established at step S106. These UL data packets are then combined by the combiner 22 of the target base station 60 and are forwarded to the access gateway 40 by the target base station 60 or, are stored until they can be forwarded to the access gateway 40 after establishment of a dedicated link t6 between the access gateway 40 and the target base station 60 (see below).

Figure 4C:
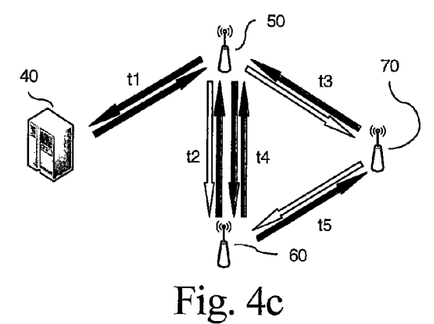
Figure 4D:
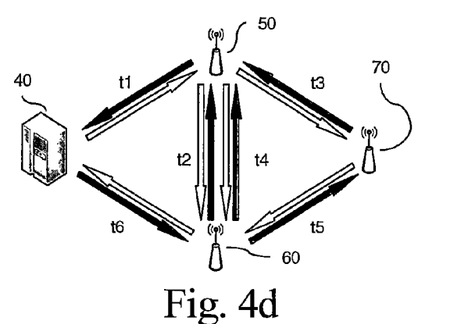
Figure 4E:
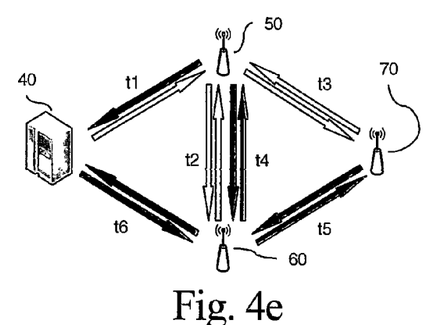

Note that in FIGS. 4a to 4f, the first UL data packet bearing a sequence number equal to or higher than the sequence number SN_UL_Last is assumed to be received from the mobile terminal 10 just before the situation depicted in FIG. 4e where it can be delivered to the access gateway 40 via the dedicated link t6, which was created in FIG. 4d.

At that step 106, each supplementary base station 70 is capable to transmit to the mobile terminal 10 the DL data packets that it has received either from the source base station 50 via the dedicated link t3 or from the target base station 60 via the dedicated link t5.

At next step S107, after having received the HN message and set up the dedicated link t5 with the target base station 60, each supplementary base station 70 sends back a handover notification acknowledgment message HNA to the target base station 60.

At next step S108, after having received the HNA message from each of the supplementary base station 70, the target base station 60 sends a handover request acknowledgment HRA message to the source base station 50. The HRA message contains the identifiers of the supplementary base stations 70 that have an established network relation with the target base station 60 as determined in S104.

At next step S109, considering the current set of base stations 70 and the final set as determined by the target base station 60 at step S104 and received from that base station 60 in the HRA message, the source base station 50 determines an intermediate set of base stations 70, containing only the base stations 70 that are included in both the current set and the final set.

The situation is now the situation of FIG. 4b.

At next step S110, upon reception of the message HRA, the source base station 50 identifies a sequence number SN_DL_Last of the last data packet that will be built by its splitter 22.

At next step S111, after having determined the sequence number SN_DL_Last at step S110, the source base station 50 sends a SN_DL_Status_Transfer message SN to the target base station 60, including that sequence number SN_DL_Last.

At next step S112, upon reception of the message SN, the splitter 22 of the target base station 60 is now ready to start building consecutive DL data packets from DL data received from the access gateway 40 either directly or via the source base station 50, starting the numbering of built DL data packet with the sequence number SN_DL_Last. However, at that step, the splitter 22 of the target base station 60 cannot yet build DL data packets with a correct sequence number since no data can yet be received from the access gateway 40 neither directly nor via the source base station 50.

At a next step S113, once having built the DL data packet bearing the sequence number SN_DL_Last determined at step S110, the splitter 22 of the source base station 50 stops building DL data packets from DL data received from the gateway 40. The source base station 50 starts forwarding DL data received from the access gateway 40 to the target base station 60 through the dedicated link t4 established between the source base station 50 and the target base station 60.

At next step S114, upon reception of the DL data from the access gateway 40 via the source base station 50 through the dedicated link t4 established between the source base station 50 and the target base station 60, the splitter 22 of the target base station 60 starts building DL packets bearing consecutive sequence numbers, starting with the sequence number SN_DL_Last included in that message SN and then splits the built DL data packets, which are individually sent to the mobile terminal 10 via the radio channel of the target base station 60 or via one of the links t5 established between the target base station 60 and, on the one hand, the supplementary base stations 70 and, on the other hand, the source base station 50. The DL data packets thus received by the supplementary base stations 70 are directly sent to the mobile terminal 10 via the radio channel established between the supplementary base station 70 and the mobile terminal 10.

The situation is now the situation of FIG. 4c.

At next step S115, according to a first variant, the source base station 50 sends to the mobile terminal 10 a Handover Command message HC informing the mobile terminal 10 that the target base station 60 is now handling the exchange of signaling messages with the mobile terminal 10. The HC message also informs the mobile terminal 10 about the information related to the radio channel established with each supplementary base station 70 which was not contained in the received HRA message.

Note that in another embodiment, instead of being sent by the source base station 50, the HC message could alternatively be sent by the target base station 60 upon reception of the HNA messages issued by all supplementary base stations 70. The quality of transmission of the HC message could be higher than if received by the mobile terminal 10 over the radio channel established with the source base station 50.

From now, the mobile terminal 10 no longer sees the radio channel established with the source base station 50 as its main radio channel but rather as a supplementary radio channel, and sees the radio channel established with the target base station 60 as its main radio channel, and no longer as a supplementary radio channel. As a consequence, the data packets of delay sensitive data flows (e.g. video streaming, voice applications, etc) are no longer routed via the source base station 50 but via the target base station 60.

At that step, the mobile terminal 10 is informed to release radio channels established with supplementary base stations 70 which are not contained in the received HRA message.

At next step S116, upon reception of the HC message, the mobile terminal 10 sends a Handover Confirm message HCF to the target base station 60 indicated in the received HC message. From now the mobile terminal 10 will exchange signaling messages only with the target base station 60.

In yet another embodiment, the mobile terminal 10 sends the HCF message (if any) to the source base station 50, which then relays it to the target base station 60.

According to a second variant, no HC message is sent to the mobile terminal 10 and no HCF message is sent to the source base station 50 or to the target base station 60. In this case, the mobile terminal 10 decides which radio channel should be used for signaling according to quality estimates of each radio channel. According to this second variant, any supplementary base station which receives a signaling message sends the received signaling message to the main base station which serves the mobile terminal via the dedicated link established between the supplementary base station and the main base station.

At anytime, upon reception of both the SN message and the HCF message, the target base station 60 sends in a step S117 to the gateway 40 a Path Switch message PS.

Note that in all the embodiments described here, the PS message could also be sent by the source base station 50 upon reception of the HRA message or by the target base station 60 upon reception of all HNA messages from supplementary base stations 70.

At the next step S118, upon reception of the PS message by the gateway 40, a dedicated link t6 is set up between the target base station 60 and the gateway 40. This dedicated link is as example a S1 tunnel. This dedicated link corresponds to the tunnel t6 of FIG. 4e. At that step, target base station 60 starts storing any DL data being received from the access gateway 40 through the established dedicated link t6.

At that step, target base station 60 starts sending any stored UL data combined by the combiner 22 of the target base station 60 to the access gateway 40 through the established dedicated link t6. Once all stored, UL data have been sent to the access gateway 40, the target base station 60 then starts sending to the access gateway 40 on the dedicated link t6 UL data being combined by its combiner 22 and stops storing UL data being combined by its combiner 22.

At next step S119, once the new dedicated link t6 has been set up, the access gateway 40 decides to switch the DL data flow to the target base station 60 indicated in the received PS message and sends via the dedicated link t1 established between the access gateway 40 and the source base station 50 a specific DL data LPM, being the last DL packet to be sent to the mobile terminal 10 via the dedicated link t1 established between the access gateway 40 and the source base station 50. The specific DL data LPM contains a last packet marking indication, indicating that next DL data packets will be sent by the access gateway 40 to the target base station 60 rather to the source base station 50.

At that step S119, the access gateway 40 starts transmitting consecutive DL data to the target base station 60 through the dedicated link t6 established at step S118. From now, DL data are no longer sent by the gateway 40 to the source base station 50 as it was the case up to now but rather to the target base station 60.

At next step S120, the access gateway 40 sends to the target base station 60 a path switch acknowledgement message PSA.

At next step S121, upon reception of the specific DL data LPM, the source base station 50 sends the specific DL data LPM to the target base station 60, as done for any DL data received since completion of step S113. But, from now, source base station 50 has no need to transfer DL data to the target base station 60 as it was the case up to now.

In a variant, the source base station 50 sends the specific DL data LPM to the target base station 60 only after step S124 (see below), once all UL data packets bearing a sequence number SN_UL smaller or equal to the sequence number SN_UL_Last as determined at step S101 have been received by the base station 50, and once the corresponding data combined by the combiner 22 of the base station 50 have been delivered to the access gateway 40 through the dedicated link t1 established between the base station 50 and the access gateway 40.

At next step S122, upon reception of the specific DL data LPM, the target base station 60 detects the last packet marking indication contained in the received specific DL data LPM, and the splitter 22 splits the specific DL data LPM into numbered DL data packets as described at step S114, the corresponding DL data packets being sent to the mobile terminal 10 either directly or via one supplementary base station 70 through a dedicated link t5 established at step S106.

At next step S123, the splitter 22 stops splitting any consecutive DL data that could be received from the source base station 50 through the dedicated link t4 and starts building and splitting DL data packets from the stored DL data that were received directly from the access gateway 40 via the dedicated link t6 established at step S118.

At that step S123 also, once all stored DL data have been split, splitter 22 of target base station 60 starts building and splitting DL data packets from the DL data received from the access gateway 40 through the dedicated link t6 established at step S118, and stops storing the DL data received from the access gateway 40 through the dedicated link t6. The produced splits of downlink data packets are then sent individually to one of each supplementary base station 70 and 50 via the dedicated link t5 established at step S106 between the target base station 60 and the one of each supplementary base station 70 and 50.

At that step, each supplementary base station 70 or 50 starts transmitting over the radio channel they have established with the mobile terminal 10 the DL data packets which are received from the target base station 60 via the dedicated links t5 and t4 respectively established between the supplementary base stations 70 and 50 and the target base station 60.

In a variant, each supplementary base station 70 receives DL data packets out of order from both source base station 50 and target base station 60 and continues to transmit over the radio channel they have established with the mobile terminal 10 the DL data packets received from the source base station 50, even if these DL data packets are received by that supplementary base station 70 after any DL data packet has been received by that supplementary base 70 from the target base station 60.

The situation is the one depicted in FIG. 4d.

At step S124, the mobile terminal 10 starts transmitting uplink data packets that have sequence numbers higher than the sequence number SN_UL_Last determined at step S101.

In FIG. 5, step S124 is represented to occur after step S123, but in practice, depending on the choice on the sequence number SN_UL_Last made by the source base station 50 at step S101, it could also happen anytime between steps S107 and steps S123 without impacting the effectiveness of the invention.

As soon as the mobile terminal 10 starts transmitting uplink data packets that have sequence numbers higher than the determined sequence number SN_UL_Last, the source base station 50 starts forwarding to the target base station 60 these uplink data packets received directly from the mobile terminal 10. Furthermore, it stops operation of its combiner 22 once all uplink data packets bearing a sequence number equal or lower than the determined sequence number SN_UL_Last are received.

At the same time, each supplementary base station 70 starts forwarding uplink data packets received with sequence number equal to or higher than the determined sequence number SN_UL_Last to the target base station 60.

At the same time, the target base station 60 starts combining uplink data packets with a sequence number higher than the determined sequence number UL_SN_Last which are received directly by the base station 60 or via supplementary base stations 50 or 70 through dedicated links t5 established between the target base station 60 and a supplementary base station 50 or 70.

At next step S125, the resulting UL data are sent to the access gateway 40 via the dedicated link t6 established between the target base station 60 and the access gateway 40. If step 125 is carried out before the establishment of the dedicated link t6, between the target base station 60 and the access gateway 40, UL data are stored until this link t6 is established.

In a variant, the UL data can be sent to the access gateway 40 only once the specific DL data LPM are received from the source base station 50.

All these operations are made as soon as the mobile terminal 10 starts transmitting uplink data packets bearing a sequence number equal to or higher than SN_UL_Last as determined at step S101. So, it can happen at any time after the completion of the step S101. As mentioned above, if the dedicated link t6 has not been yet established for enabling the UL data packets received by the target base station 60 to be sent to the access gateway 40 as in step S118, these UL data packets are stored in the target base station 60.

In a variant, uplink data packets are received out of order by each base station 50, 60 and 70, and uplink data packets received with a sequence number lower than the predetermined sequence number SN_UL_Last are sent to the combiner 22 of the source base station 50 either directly or via a dedicated link, even if these packets are received after step 124.

At the next step S125, upon reception of the PSA message and of the specific packet LPM received from the source base station 50, the UL data packets issued from the mobile terminal 10, either directly received by the target base station 60, or via the source base station 50, or via the supplementary base station 70, are combined by the combiner 22 of the target base station 60 and forwarded to the gateway 40 using the dedicated link t6 created in the step S118.

Note that step 125 can simultaneously be carried out with step S123. The situation is the situation of FIG. 4e.

At next step S126, the target base station 60 then sends a Release Resource message RR to the source base station 50.

At next step S127, when the source base station 50 receives the RR message, the source base station 50 performs a release of the dedicated link established between the source base station 50 and the access gateway 40, and a release of the dedicated links established between the source base station 50 and the supplementary base stations 70.

At that step S127, each supplementary base station 70 which no longer has any dedicated link with any main base station, releases the radio channel it has established with the mobile terminal 10.

Figure 4F:
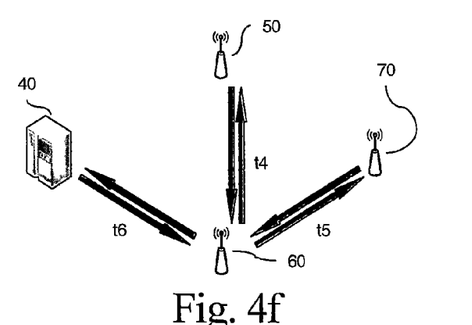

The situation is the situation of FIG. 4f.

In a variant, at next step S128, the target base station 60 sets up dedicated links for the mobile terminal 10 with some neighboring base stations which are not already linked thereto, the neighboring base stations setup new radio channels with the mobile terminal 10 and the target base station 60 commands to the mobile terminal 10 to setup the established radio channels with appropriate information obtained from the neighboring base stations (CRNTI, cell id, duplex mode, frequency band, code, etc).

Note that steps S10, S12, S14, S16, S20, S22, S24, and S30 described in relation with in FIG. 3 respectively correspond to the steps S100, S102, S109, S127, S104, S108, S128, and S107 of the method described in relation with FIG. 5.

The step S18 described in relation with FIG. 3 corresponds to the steps S115 to S126 of the method described in relation with FIG. 5.

The various steps S100 to S128 as depicted in relation with FIG. 5 are in an exemplified order that can be changed as long as they lead from the situation depicted in FIG. 4a to the situation depicted in FIG. 4f. For example, it may happen a situation where downlink data packets built from DL data received from the access gateway 40 by the source base station 50 are still being forwarded to the supplementary base stations 70 and 60 by the source base station 50, while uplink data packets are forwarded by the supplementary base stations 70 and 50 to the target base station 60, which recombines the uplink data and sends it over a newly established dedicated link 10 between the target base station 60 and the access gateway 40. In that case, the final situation is still depicted in the FIG. 4.f.

Figure 6:
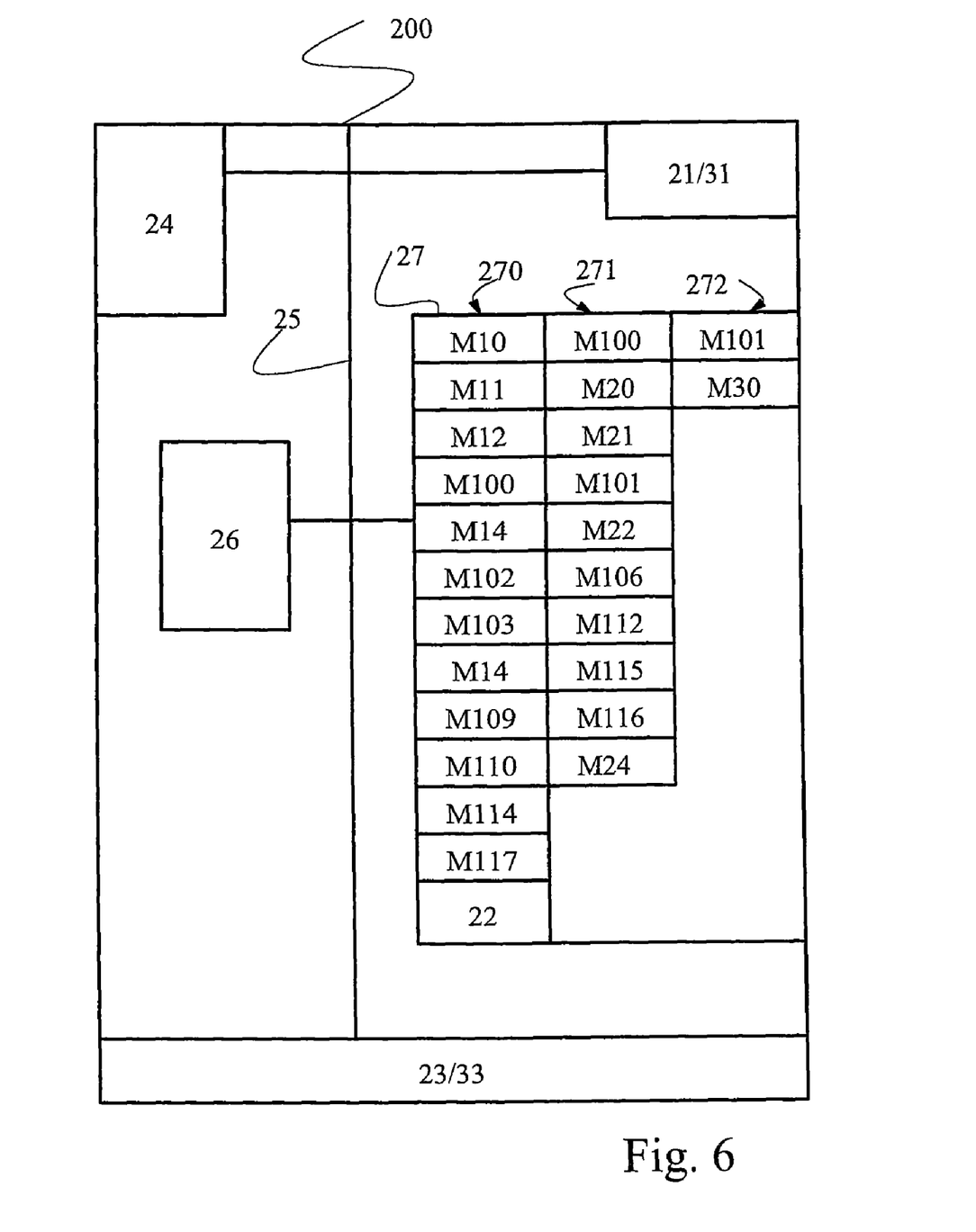
FIG. 6 shows a base station according to the invention.

A base station according to the invention and as depicted in FIG. 6 has, for example, an architecture based on components connected together by a bus 25 and a processor 26 controlled by programs comprising instructions or portions of code for implementing the steps of the method according to the invention described here in relation with FIGS. 2a to 2d, 3, 4a to 4f and 5.

The bus 25 links together the processor 26, a memory means 27 containing the instructions or portions of code for implementing the steps of the method according to the invention, a radio frequency transceiver 21 provided for communicating with the main RF transceiver 12 of a mobile terminal 10, and a network interface 23 enabling the communication with other base stations and with an access gateway 40.

The network interface 23 contains means to setup, use and release dedicated links with other base stations, for example X2 tunnels, and means to setup, use and release dedicated links with the access gateway 40, for example S1 tunnels.

The splitter/combiner 22 of a base station when it acts as a main base station 20 can be implemented either by hardware or by a specific program which instructions are contained in the memory means 27 as it is the case in the embodiment of FIG. 6.

For purposes of clarity, memory means 27 are represented in FIG. 6 with three sections: first one 270 contains means used when the base station acts as a source base station, second one 271 contains means used when the base station acts as a target base station and third one 272 contains means used when the base station acts as a supplementary base station.

In FIG. 6, the reference of each of the means in the memory means 27 is constituted by the letter M followed by a number. These means store code to carry out a step of the method described in relation with either FIG. 3 or FIG. 5, of which the reference is formed of the letter S followed by the same number. For example, means M10 are intended to carry out the step S10 of the method according to the invention.

So, section 270 includes at least means M10, M12, M14, M16, and M18, which respectively store code to carry out the steps S10, S12, S14, and S16 of the method according to the invention. An embodiment for implementing the method described in relation with FIG. 5 would comprise means M100, M101, M102, M103, M109, M110, M111, M113, M115, M117, M121, and M127 for respectively storing code for carrying out the corresponding steps S100, S101, S102, S103, S109, S110, S111, S113, S115, S117, S121, and S127 of the said method.

Section 271 includes at least means M20, M22, and M24, which respectively store code to carry out the steps S20, S22, and S24 of the method according to the invention. An embodiment for implementing the method described in relation with FIG. 5 would comprise means M103, M104, M105, M106, M108, M112, M114, M117, M118, M122, M123, M125, M126, and M128 for respectively storing code for carrying out the corresponding S103, S104, S105, S106, S108, S112, S114, S117, S118, S122, S123, S125, S126, and S128 of the said method.

An embodiment of section 272 for implementing the method described in relation with FIG. 5 would comprise means M106, M107, M127, and M30 for respectively storing code for carrying out the corresponding steps S106, S107, S127, and S30 of the said method.

Figure 7:
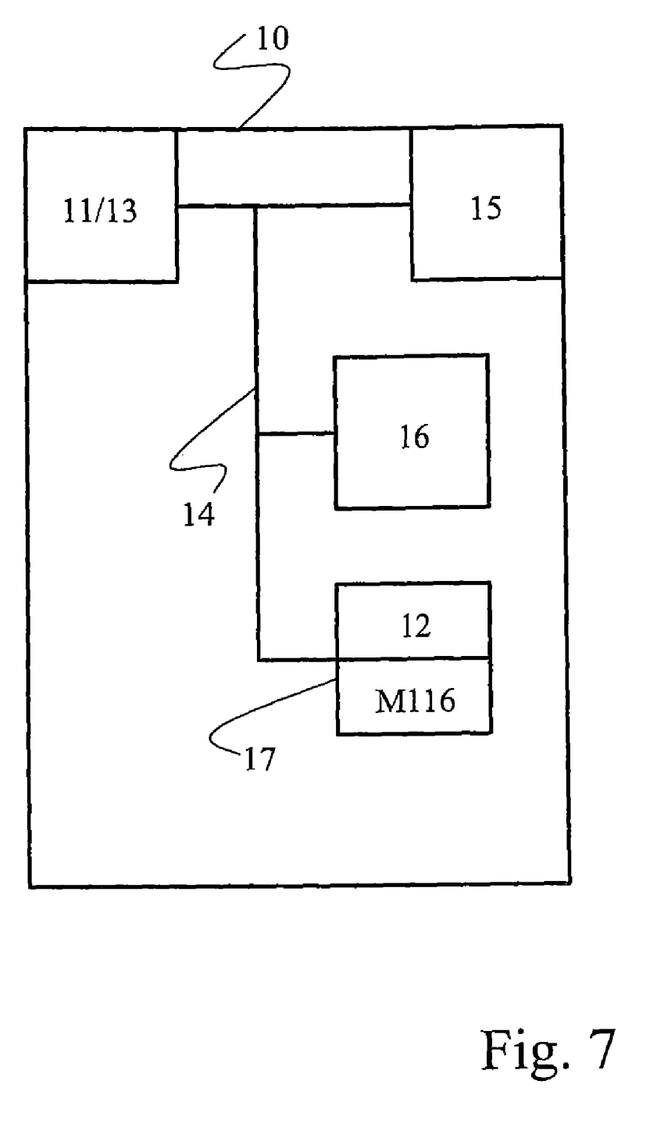
FIG. 7 shows a mobile terminal according to the invention.

A mobile terminal 10 according to the invention and as depicted in FIG. 7 has, for example, an architecture based on components connected together by a bus 14 and a processor 16 controlled by programs comprising instructions or portions of code for implementing the steps of the method according to the invention described here in relation with FIGS. 2a to 2d, 3, 4a to 4f and 5.

The bus 14 links together the processor 16, a memory means 17 containing at least the instructions or portions of code for implementing the steps of the method according to the invention, a radio frequency transceiver 11/13 provided for communicating with each of the RF transceivers 21/31 of base stations involved in the communication with that mobile terminal 10 and a source 15 of data to be sent to a distant terminal.

The splitter/combiner 12 of a mobile terminal can be implemented either by hardware or by a specific program which instructions are contained in the memory means 17 as it is the case in the embodiment of FIG. 6.

Memory means 17 includes means M116 for carrying out the step S116 of the method described in relation with FIG. 5.

The invention claimed is:

1. Method for carrying out a handover between base stations of a telecommunication network, wherein each mobile terminal is in communication with a set of base stations including at least a first base station and a second base station, the first base station receiving downlink data to be transmitted within data packets bearing a downlink sequence number to a first mobile terminal from an access gateway of the telecommunication network, wherein the method comprises the steps executed by the first base station of determining a downlink sequence number, sending a handover request message to the second base station comprising the determined downlink sequence number and information related to the set of base stations, requesting the second base station to receive data to be transmitted to the first mobile terminal from the access gateway, stopping building data packets to be transmitted to the first mobile terminal from data received from the access gateway if said built data packets would bear a sequence number equal to or higher than the determined downlink sequence number, sending said data received from the access gateway to the second base station, receiving data packets to be transmitted to the first mobile terminal from the second base station, transmitting directly to the first mobile terminal the data packets to be transmitted to the first mobile terminal received from the second base station, receiving specific data from the access gateway indicating that subsequent data will be now transmitted to the second base station, and releasing a dedicated link between said first base station and said access gateway.

2. Method according to claim 1, wherein each mobile terminal sends to the base stations of the set of base stations data packets bearing a uplink sequence number, the first base station building data from the data packets received from the mobile terminal either directly or via the other base stations and forwarding said data to the access gateway, wherein the method comprises the steps executed by the first base station of determining an uplink sequence number and sending it to the second base station, receiving data packets directly from the first mobile terminal, or from other base station, building data from the received data packet and forwarding said built data to the access gateway if said received data packet is bearing a sequence number smaller than the determined uplink sequence number, and forwarding the received data packet to the second base station if said received data packet is bearing a sequence number higher than or equal to the determined uplink sequence number.

3. Method according to claim 1, wherein the method comprises the steps executed by the first base station of receiving a handover request acknowledgement message comprising information related to a final set of base stations including the base stations involved in the communication with said first mobile terminal after said handover completion, and releasing dedicated links established with base stations of the current set of base stations, which do not belong to the final set of base stations.

4. Method according to claim 3, wherein the method comprises further steps executed by the first mobile terminal of stopping receiving data packets from the base stations of the set of base station which are not comprised in the final set of base stations, of which information is comprised in the received handover command message, stopping sending data packets to the base stations of the set of base stations which are not comprised in the final set of base stations, of which information is comprised in the received handover command message, identifying the final set of base stations of which information is comprised in the received handover command message, as the set of base stations with which said first mobile terminal is in communication.

5. Method according to claim 1, wherein the method comprises the steps executed by the first base station of sending directly to the first mobile terminal a handover command message, requesting said first mobile terminal to now send signaling messages to the second base station, and stopping to manage signaling messages received from the first mobile terminal.

6. Method according to claim 5, wherein the sent handover command message comprises information related to the base stations of said final set of base stations.

7. Method according to claim 1, wherein the method comprises further steps executed by the first base station of:
- receiving a handover request message from a third base station that receives data to be transmitted within data packets bearing a downlink sequence number to a second mobile terminal from an access gateway of the telecommunication network, said handover request message requesting the first base station to receive data to be transmitted to said second mobile terminal from said access gateway and comprising downlink and uplink sequence numbers and information related to the set of base stations with which the second mobile terminal is currently in communication,
- determining a final set of base stations including the base stations involved in the communication with said second mobile terminal after said handover completion, and
- sending a handover notification message to each base station of said final set of base stations comprising the downlink and uplink sequence numbers and informing each base station of said set of base stations and that the first base station now receives data to be transmitted to the second mobile terminal from the access gateway, and
- establishing a dedicated link between the first base station and each base station of said final set of base stations.

8. Method according to claim 7, wherein said final set of base stations contains base stations which have a network interface established with the first base station, and in that it comprises a further step executed by the first base station of sending a handover request answer message to the third base station comprising information related to the base stations of said final set of base stations.

9. Method according to claim 8, wherein the method comprises further steps executed by the first base station of
- receiving data from the access gateway via the third base station,
- starting building data packets to be transmitted to the second mobile terminal from said received data, the first data packet bearing a downlink sequence number equal to the downlink sequence number that is contained in the received handover request message, and
- sending built data packets to be transmitted to the second mobile terminal directly or via one dedicated link established with one base station of said set of base stations.

10. Method according to claim 7, wherein the method comprises further steps executed by the first base station of
- establishing a dedicated link with the access gateway,
- receiving data from the access gateway over the established dedicated link,
- receiving data from the third base station with a last packet marking indication,
- building data packets from the data received from the third base station,
- starting building data packets from data received from the access gateway, and
- sending built data packets to be transmitted to the second mobile terminal directly or via one established dedicated link with one base station of the set of base stations which information is comprised in the received handover request message.

11. Method according to claim 10, wherein the method comprises further steps executed by the first base station of
- receiving directly from the second mobile terminal data packets bearing a uplink sequence number higher than the uplink sequence number that is contained in the received handover request message,
- receiving data packets via any dedicated link established with each base station of the set of base stations of which information is comprised in the received handover request message,
- building data from the thus received data packets,
- forwarding said built data to the access gateway via the dedicated link established with the access gateway.

12. Method according to claim 7, wherein the method comprises further steps executed by the first base station of managing signaling messages received from the second mobile terminal.

13. Method according to claim 7, wherein the method comprises further steps executed by the first base station of sending signaling messages directly to the second mobile terminal.

14. Method according to claim 1, wherein the method comprises further steps executed by the first base station of:
- receiving a handover notification message from a fourth base station comprising downlink and uplink sequence numbers and informing the first base station that said fourth base station will receive data to be transmitted to a third mobile terminal from an access gateway,
- establishing a dedicated link between the first base station and said fourth base station,
- receiving data packets to be transmitted to the third mobile terminal from the fourth base station over the dedicated link established between the first base station and the fourth base station, and
- transmitting directly to the third mobile terminal the received data packet to be transmitted to the third mobile terminal.

15. Method according to claim 14, wherein the method comprises further steps executed by the first base station of
- receiving directly from the mobile terminal data packets bearing a uplink sequence number higher than the uplink sequence number that is contained in the received handover notification message, and
- sending to the fourth base station over the established dedicated link the received data packets bearing a uplink sequence number higher than the uplink sequence number that is contained in the received handover notification message.

16. Method according to claim 1, wherein the method comprises further steps executed by the first mobile terminal of
- receiving from the first base station a handover command message requesting said first mobile terminal to send signaling messages to the second base station,
- stopping sending signaling messages to the first base station, and
- starting sending signaling messages to the second base station.

17. Device for carrying out a handover between base stations of a telecommunication network, wherein each mobile terminal is in communication with a set of base stations including at least a first and a second base stations, the first base station receiving data to be transmitted within data packets bearing a sequence number to a first mobile terminal from an access gateway of the telecommunication network, wherein the device is included in the first base station and comprises:
- means for determining a downlink sequence number,
- means for sending a handover request message to the second base station comprising the determined downlink sequence number, and information related to the set of base stations, requesting the second base station to receive data to be transmitted to the first mobile terminal from the access gateway, means for stopping building data packets to be transmitted to the first mobile terminal from data received from the access gateway if said built data packets would bear a sequence number equal or higher than the determined downlink sequence number, means for sending said data received from the access gateway to the second base station, means for receiving data packets to be transmitted to the first mobile terminal from the second base station, means for transmitting directly to the first mobile terminal the data packets to be transmitted to the first mobile terminal received from the second base station, means for receiving specific data from the access gateway indicating that subsequent data will be now transmitted to the second base station, and means for releasing the dedicated link between said first base station and said access gateway.

* * * * *